United States Patent
Thomson (10) Patent No.: US 10,412,055 B2
(45) Date of Patent: Sep. 10, 2019

(54) ENABLING TRANSMISSION ENCRYPTION (71) Applicant: TELEFONAKTIEBOLAGET L M ERICSSON (PUBL), Stockholm (SE)

(72) Inventor: Anders Thomson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 155 days.

(21) Appl. No.: 14/891,235

(22) PCT Filed: Mar. 9, 2015

(86) PCT No.: PCT/SE2015/050258
§ 371 (c)(1),
(2) Date: Nov. 13, 2015

(87) PCT Pub. No.: WO2016/144215
PCT Pub. Date: Sep. 15, 2016

(65) Prior Publication Data
US 2016/0269369 A1 Sep. 15, 2016

(51) Int. Cl.
*H04L 9/32* (2006.01)
*H04L 29/06* (2006.01)
*G06F 21/00* (2013.01)

(52) U.S. Cl.
CPC .......... *H04L 63/0428* (2013.01); *H04L 63/06* (2013.01); *H04L 63/166* (2013.01)

(58) Field of Classification Search
CPC ... H04L 63/0428; H04L 63/06; H04L 63/166; G06F 17/30902; G06F 2221/2151
USPC ........ 713/150, 153, 188, 168; 709/201, 203, 709/217, 219, 225, 227, 238, 245; 726/12, 22, 23, 24, 25
See application file for complete search history.

(56) References Cited

U.S. PATENT DOCUMENTS

| | | | | |
|---|---|---|---|---|
| 7,093,121 | B2 * | 8/2006 | Barton | H04L 63/0281 709/203 |
| 7,137,143 | B2 * | 11/2006 | Chawla | H04L 63/04 726/12 |
| 7,661,131 | B1 * | 2/2010 | Shaw | H04L 63/029 709/220 |

(Continued)

FOREIGN PATENT DOCUMENTS

EP  1533982 A2  5/2005

OTHER PUBLICATIONS

International Search Report and the Written Opinion of the International Searching Authority dated Nov. 12, 2015, in International Application No. PCT/SE2015/050258, 12 pages.

(Continued)

*Primary Examiner* — Gary S Gracia
(74) *Attorney, Agent, or Firm* — Rothwell, Figg, Ernst & Manbeck, P.C.

(57) ABSTRACT

It is presented a method performed in a proxy. The method comprises the steps of: establishing a first secure connection between the proxy and a content server; forwarding messages between a client and the content server to establish a second secure connection between the client and the content server; receiving security parameters from the content server over the first secure connection, the security parameters being associated with the second secure connection; obtaining the content; and transmitting the content to the client using an encryption key derived from the security parameters.

28 Claims, 5 Drawing Sheets

(56) References Cited

U.S. PATENT DOCUMENTS

| | | | | |
|---|---|---|---|---|
| 8,307,024 B2* | 11/2012 | Setton | ................ | H04L 65/4084 709/200 |
| 9,239,868 B2* | 1/2016 | Neerincx | .............. | H04L 67/146 |
| 9,712,621 B1* | 7/2017 | Bowen | .................... | H04L 67/14 |
| 2002/0016911 A1* | 2/2002 | Chawla | .................. | H04L 63/04 713/153 |
| 2004/0015725 A1* | 1/2004 | Boneh | .................. | H04L 63/166 713/160 |
| 2004/0103316 A1* | 5/2004 | Gehrmann | ............ | H04L 63/065 713/171 |
| 2004/0162076 A1* | 8/2004 | Chowdry | ............ | H04L 63/0281 455/445 |
| 2008/0091812 A1* | 4/2008 | Lev-Ran | ........... | H04L 29/12169 709/223 |
| 2008/0126794 A1* | 5/2008 | Wang | .................. | H04L 63/0464 713/151 |
| 2008/0307219 A1* | 12/2008 | Karandikar | ............ | H04L 63/166 713/153 |
| 2009/0132808 A1* | 5/2009 | Baentsch | ............ | H04L 63/0471 713/152 |
| 2009/0328183 A1* | 12/2009 | Frenkel | ................. | G06F 21/567 726/11 |
| 2010/0057920 A1* | 3/2010 | Lee | .................... | H04L 65/1093 709/228 |
| 2010/0161741 A1* | 6/2010 | Jiang | ........................ | H04L 63/02 709/206 |
| 2011/0154019 A1* | 6/2011 | Wang | ................. | H04L 63/0281 713/153 |
| 2011/0185071 A1* | 7/2011 | Schmieder | .............. | H04L 67/14 709/228 |
| 2012/0151070 A1* | 6/2012 | Li | ........................ | H04L 12/6418 709/227 |
| 2012/0246743 A1* | 9/2012 | Bosch | ..................... | H04L 63/06 726/29 |
| 2013/0138824 A1* | 5/2013 | Yoshino | ................ | H04L 67/141 709/228 |
| 2013/0145036 A1* | 6/2013 | Ly | ........................ | H04L 67/2814 709/227 |
| 2013/0227291 A1* | 8/2013 | Ahmed | ............... | H04L 63/0281 713/171 |
| 2013/0246631 A1* | 9/2013 | Gonzales | ........... | H04N 21/6405 709/227 |
| 2014/0082204 A1* | 3/2014 | Shankar | ................ | H04L 63/166 709/227 |
| 2014/0129674 A1* | 5/2014 | Matsuda | ................ | H04L 69/321 709/217 |
| 2015/0195253 A1* | 7/2015 | Ander | ................. | H04L 63/0281 726/12 |
| 2016/0021078 A1* | 1/2016 | Shah | ................... | H04L 63/0823 713/171 |
| 2016/0087941 A1* | 3/2016 | Mudigonda | ......... | H04L 63/0272 726/12 |

OTHER PUBLICATIONS

International Preliminary Report on Patentability, issued in corresponding International Application No. PCT/SE2015/050258, dated Jun. 21, 2017, 17 pages.

* cited by examiner

ENABLING TRANSMISSION ENCRYPTION

CROSS REFERENCE TO RELATED APPLICATION(S)

This application is a 35 U.S.C. § 371 National Phase Entry Application from PCT/SE2015/050258, filed Mar. 9, 2015, designating the United States, the disclosure of which is incorporated herein in its entirety by reference.

TECHNICAL FIELD

The invention relates to methods, computer programs, computer program products a proxy and a content server for enabling transmission encryption from the proxy.

BACKGROUND

Content providers on the Internet make increasing use of HTTP (HyperText Transfer Protocol) over TLS (Transport Layer Security), commonly known as HTTPS (HTTP Secure). In this way, content integrity is achieved, i.e. the content is prevented from being tampered with mid-transport, i.e. between the content server and the client. However, when TLS is employed, devices provided mid-transport are unaware of content and are prevented from caching content.

Caching is used to lower bandwidth requirements uplink from the cache as well as to reduce load on the content provider. Additionally, delivery times to the client can be improved. The inability to use content caches is a great disadvantage. This drives cost for the operators, both in additional backhaul (transport network) costs, and additional peering costs.

It would be of great benefit if there would be a way to provide transmission encryption from a proxy located between the content provider and the client.

SUMMARY

It is an object to provide a way in which a proxy can be delegated an ability to perform transmission encryption to a client.

According to a first aspect, it is presented a method performed in a proxy. The method comprises the steps of: establishing a first secure connection between the proxy and a content server; forwarding messages between a client and the content server to establish a second secure connection between the client and the content server; receiving security parameters from the content server over the first secure connection, the security parameters being associated with the second secure connection; obtaining the content; and transmitting the content to the client using an encryption key derived from the security parameters.

By providing the security parameters to the proxy, the content server delegates the encrypted connection to the client, thereby relieving this task from the content server itself. It is to be noted that the content server never needs to provide any private certificates to the proxy; it is sufficient that the content server provides security parameters related to the particular instance of the second secure connection, i.e. the current secure connection between rip the content server and the client. Moreover, content server is in full control of when to perform this delegation, this method can be used on a per request basis under full control of the content server.

The step of forwarding messages may comprise using a transport control protocol connection for communication with the content server, which is also used for the first secure connection.

In the step of receiving security parameters, the security parameters may comprise a uniform resource indicator for the content.

In the step of receiving security parameters, the security parameters may comprise at least some parameters of a transport layer security state for the second secure connection.

The step of obtaining the content may comprise receiving the content from the content server over the first secure connection.

The method may further comprise the step of: storing the content in a cache storage.

The step of obtaining the content may comprise retrieving the content from a cache storage.

The method may further comprise the step of forwarding a message from the content server to the client over the second secure connection, the message comprising a checksum and a content size for the content.

According to a second aspect, it is presented a proxy comprising: a processor; and a memory storing instructions that, when executed by the processor, causes the proxy to: establish a first secure connection between the proxy and a content server; forward messages between a client and the content server to establish a second secure connection between the client and the content server; receive security parameters from the content server over the first secure connection, the security parameters being associated with the second secure connection; obtain the content; and transmit the content to the client using an encryption key derived from the security parameters.

The instructions to forward messages may comprise instructions that, when executed by the processor, causes the proxy to use a transport control protocol connection for communication with the content server, which is also used for the first secure connection.

The security parameters comprise a uniform resource indicator for the content.

The security parameters may comprise at least some parameters of a transport layer security state for the second secure connection.

The instructions to obtain the content may comprise instructions that, when executed by the processor, causes the proxy to receive the content from the content server over the first secure connection.

The proxy may further comprise instructions that, when executed by the processor, causes the proxy to store the content in a cache storage.

The instructions to obtain the content may comprise instructions that, when executed by the processor, causes the proxy to retrieve the content from a cache storage.

The proxy may further comprise instructions that, when executed by the processor, causes the proxy to forward a message from the content server to the client over the second secure connection, the message comprising a checksum and a content size for the content.

According to a third aspect, it is presented a proxy comprising: means for establish a first secure connection between the proxy and a content server; means for forwarding messages between a client and the content server to establish a second secure connection between the client and the content server; means for receiving security parameters from the content server over the first secure connection, the security parameters being associated with the second secure connection; means for obtaining the content; and means for transmitting the content to the client using an encryption key derived from the security parameters.

According to a fourth aspect, it is presented a computer program comprising computer program code which, when run on a proxy causes the proxy to: establish a first secure connection between the proxy and a content server; forward messages between a client and the content server to establish a second secure connection between the client and the content server; receive security parameters from the content server over the first secure connection, the security parameters being associated with the second secure connection; obtain the content; and transmit the content to the client using an encryption key derived from the security parameters.

According to a fifth aspect, it is presented a computer program product comprising a computer program according to the fourth aspect and a computer readable means on which the computer program is stored.

According to a sixth aspect, it is presented a method performed in a content server, the method comprising the steps of: establishing a first secure connection between the content server and a proxy; establishing a second secure connection between the content server and a client; and receiving a reference to content over the second secure connection from the client; transmitting security parameters to the proxy over the first secure connection, the security parameters enabling the proxy to perform transmission encryption of content to the client in compliance with the second secure connection.

The step of establishing a second secure connection may comprise using a transport control protocol connection which is also used for the first secure connection.

The method may further comprise the steps of: receiving a request from the proxy for the content over the first secure connection; and transmitting the content to the proxy over the first secure connection.

In the step of transmitting security parameters, the security parameters may comprise a uniform resource indicator for the content.

In the step of transmitting security parameters, the security parameters may comprise at least some parameters of a transport layer security state for the second secure connection.

The method may further comprise the step of: transmitting a checksum and a content size for the content to the client over the second connection.

According to a seventh aspect, it is presented a content server comprising: a processor; and a memory storing instructions that, when executed by the processor, causes the content server to: establish a first secure connection between the content server and a proxy; establish a second secure connection between the content server and a client; and receiving a reference to content over the second secure connection from the client; transmit security parameters to the proxy over the first secure connection, the security parameters enabling the proxy to perform transmission encryption of content to the client in compliance with the second secure connection.

The instructions to establish a second secure connection may comprise instructions that, when executed by the processor, causes the content server to use a transport control protocol connection which is also used for the first secure connection.

The content server may further comprise instructions that, when executed by the processor, causes the content server to: receive a request from the proxy for the content over the first secure connection; and transmit the content to the proxy over the first secure connection.

The security parameters may comprise a uniform resource indicator for the content.

The security parameters may comprise at least some parameters of a transport layer security state for the second secure connection.

The content server may further comprise instructions that, when executed by the processor, causes the content server to transmit a checksum and a content size for the content to the client over the second connection.

According to an eighth aspect, it is presented a content server comprising: means for establishing a first secure connection between the content server and a proxy; means for establishing a second secure connection between the content server and a client; and means for receiving a reference to content over the second secure connection from the client; means for transmitting security parameters to the proxy over the first secure connection, the security parameters enabling the proxy to perform transmission encryption of content to the client in compliance with the second secure connection.

According to a ninth aspect, it is presented a computer program comprising computer program code which, when run on a content server causes the content server to: establish a first secure connection between the content server and a proxy; establish a second secure connection between the content server and a client; and receiving a reference to content over the second secure connection from the client; transmit security parameters to the proxy over the first secure connection, the security parameters enabling the proxy to perform transmission encryption of content to the client in compliance with the second secure connection.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
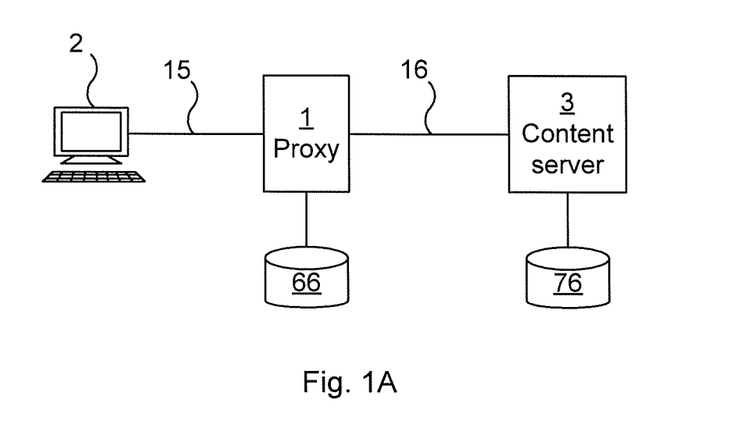
FIGS. 1A-B are schematic diagrams illustrating an environment in which embodiments presented herein can be applied.
Figure 1B:
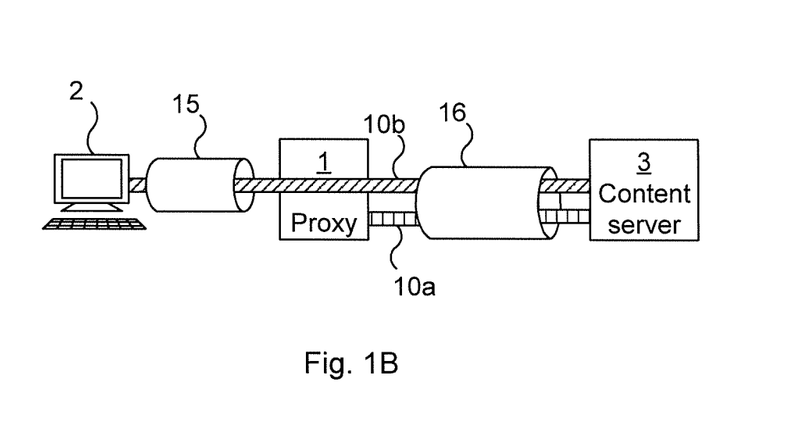

FIGS. 1A-B are schematic diagrams illustrating an environment in which embodiments presented herein can be applied.

There is here a client 2, a proxy 1 and a content server 3. There is a first transport channel 15 between the client 2 and the proxy 1 and a second transport channel 16 between the content server 3 and the proxy 1. The proxy 1 is connected to a data storage 66, e.g. for caching content for delivery to the client 2. The content server 3 is connected to a data storage 76, e.g. for storing content for delivery to the client 2.

The client 2 is any suitable mobile or fixed computer device, e.g. a mobile phone, a smart phone, a tablet/laptop computer, a stationary computer, etc. The first transport channel 15 can be wire based or wireless or a combination of both, e.g. using Internet Protocol (IP) over Ethernet over twisted pair or optical fibre, any of the IEEE 802.11x standards or a cellular network, such as any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced. Alternatively or additionally, the first transport channel 15 can be based on short distance wireless communication standards, such as Bluetooth, ZigBee, etc. The first transport channel 15 can also comprise a connection via an Internet service provider, e.g. using DSL (Digital Subscriber Line), coaxial cable (also used for cable television) and/or an optical fibre. The first transport channel 15 can e.g. be implemented using a TCP (Transport Control Protocol) connection over IP.

The second transport channel 16 can be wire based or wireless or a combination of both, e.g. using Internet Protocol (IP) over Ethernet using over twisted pair or optical fibres, or any of the IEEE 802.11x standards or even a cellular network. The second transport channel 16 can e.g. be implemented using a TCP connection over IP. Any one or both of the first transport channel 15 and the second transport channel 16 may comprise a section over a wide area network such as the Internet.

The content server 3 provides content to one or more clients 2, using any suitable delivery protocol. The content can be any suitable content, including any combination of video based content, audio based content, text based content, binary data (e.g. binary software), etc.

The proxy 1 is any suitable device capable of communicating with the client device 2 and the content server 3 according to embodiments presented herein.

It is to be noted that while only one client 2, one proxy 1 and one content server 3 is shown in FIG. 1, the embodiments presented herein are applicable to systems comprising any suitable number of clients, proxies and content servers.

Figure 2:
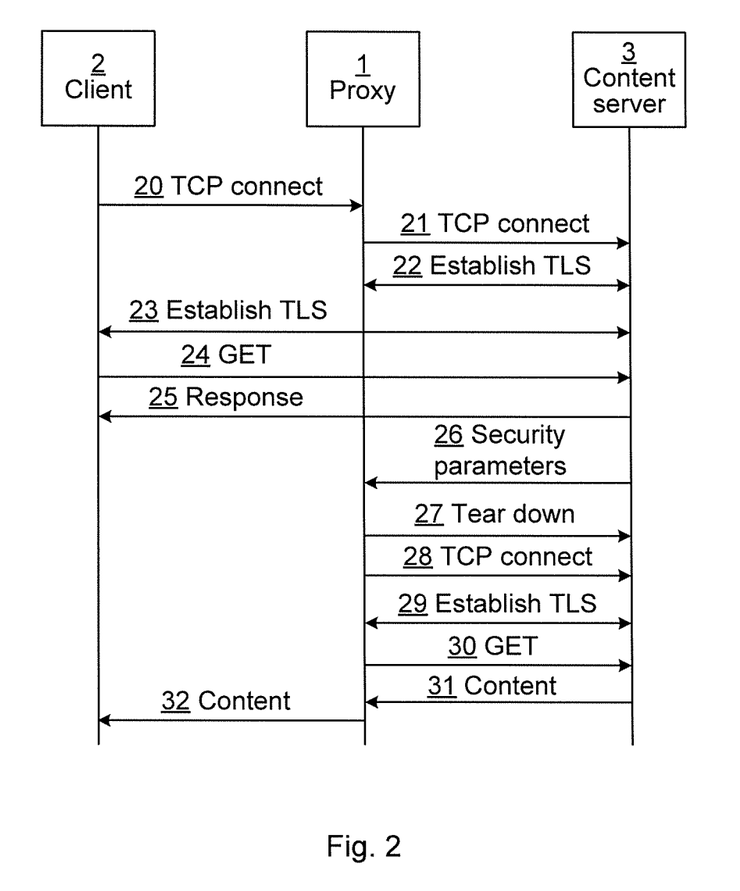
FIG. 2 is a sequence diagram illustrating communication between nodes according to one embodiment.

In FIG. 1B, it is shown how the second transport channel 16 is used as a channel for a first secure connection 10a between the proxy 1 and the content server 3. Moreover, the second transport channel 16 and the first transport channel 15 are used as channels for a second secure connection 10b between the content server 3 and the client 2. Each one of the first and the second connections can be implemented using any suitable secure connection with end-to-end security, e.g. TLS (Transport Layer Security). There may also be an intermediate layer between the secure layers 10a-b and the first transport channel 15 and the second transport channel 16. The intermediate layer allows the proxy to split up the second transport channel in separate intermediate channels, such as for intermediate channel A data and intermediate channel B data. In this way, one intermediate channel can be used for the first secure connection 10a and one intermediate channel can be used for the second secure connection 10b. Hence, the proxy can distinguish between data to be relayed to the client and data intended for the proxy. The intermediate layer can be implemented using any suitable protocol, including escape sequences for the separate intermediate channels, SSH (Secure Shell) style channels, or Diameter in which case each channel is a Diameter application. FIG. 2 is a sequence diagram illustrating communication between nodes according to one embodiment. The sequence will be described also with reference to FIGS. 1A-B.

First, the client 2 transmits a TCP connect message 20 which is received by the proxy 1, after which the first transport channel 15 is set up. The proxy 1 then transmits a TCP connect message 21 to the content server 3, whereby the second transport channel 16 is set up.

The proxy 1 and the content server 3 then establish TLS 22 to make up the first secure connection 10a. Moreover, the content server 3 and the client 2 establish TLS 23 to make up the second secure connection 10b, during which the proxy 1 simply forwards messages between the client 2 and the content server 3.

The client 2 then requests content e.g. via a HTTP GET message 24 over the second secure channel to the content server 3. It is to be noted that other message types can be used for this request, e.g. HTTP POST, etc. The content server 3 sends a response 25 comprising metadata for the content, such as content length, a check sum etc., and also a connection close indication. The connection close indication indicates that the client should close the first connection (the one between the client and the proxy) after the content (31 and 32, explained below) is received. In this way, the content server prevents the connection to the client to be used by the proxy for other purposes.

The content server 3 is now ready to delegate the content delivery to the client 2 to the proxy 1 and transmits security parameters 26 to the proxy 1. These security parameters are associated with the second secure connection 10b and allows the proxy 1 to perform transmission encryption for this particular secure connection 10b. The security parameters 26 can also contain a URI (Uniform Resource Indicator) to the content, either at the content server 3 transmitting the security parameters, or at any other server location. It is to be noted that the URI of the security parameter 26 may, but does not need to be, the same URI which forms part of the HTTP GET message 24.

The proxy 1 sends, if called for by the protocol of the intermediate connection, appropriate one or more tear down messages 27 to the content server 3 to tear down the intermediate connection carrying data intended for the client. This will result in the content server dropping its end of the second secure channel 10b with the client. The proxy 1 is now in a state where it is safe to take over the data transfer of the response to the client, once the content is available. In order to make the content available at the proxy 1, the proxy 1 can then optionally obtain the content from the content server 3. It is to be noted that the content server holding the content 3 can be different from the content server 3 described for earlier parts of the sequence, as indicated by the URI. The obtaining of content is not needed if the content already is stored in a cache memory at the proxy 1. When content is to be obtained and no existing TCP and TLS connection can be used, the proxy 1 sends a TCP connect message 28 and establishes a new TLS connection 29 with the content server 3. The proxy 1 sends a request 30 to get the content, e.g. as an HTTP/HTTPS GET message, after which the content server 3 responds with the content 31.

Regardless whether the proxy 1 obtains the content from a cache memory or from the content server 3, the proxy 1 then performs transmission encryption to provide the content 32 to the client. The encryption key used for the transmission encryption is derived, directly or indirectly, from the security parameters 26. The delivery of the content 32 to the client is the final part of the request/response chain started with the GET message 24. In other words, the proxy 1 completes the response part of the request/response chain, all transparent to the client 2.

Figure 3A:
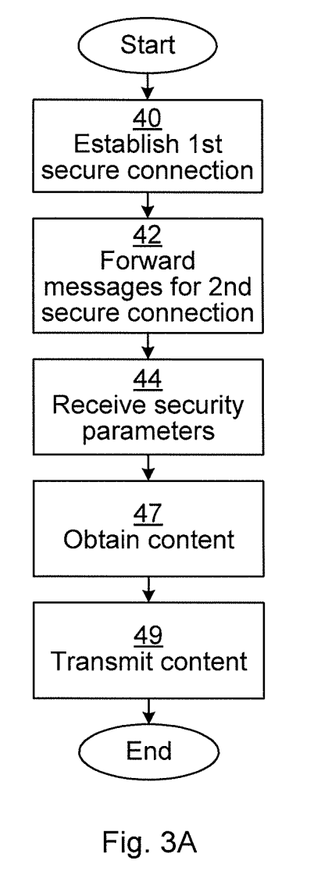
FIGS. 3A-B are flow charts illustrating methods performed in a proxy for transmission encryption.
Figure 3B:
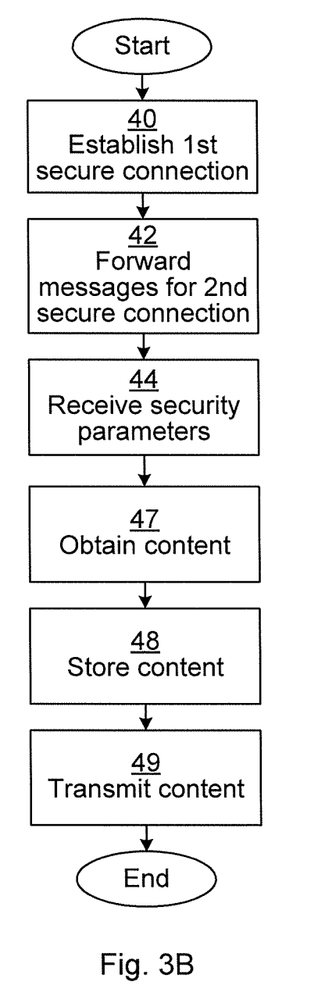

FIGS. 3A-B are flow charts illustrating methods performed in a proxy for transmission encryption.

In an establish first secure connection step 40, the first secure connection is established between the proxy and a content server.

In a forward messages for second secure connection step 42, messages are forwarded between a client and the content server to establish the second secure connection between the client and the content server.

The forwarding can be performed using a TCP connection (i.e. the second transport channel 16 described above) for communication with the content server, which is also used for the first secure connection. For instance, such a TCP connection can be the second transport channel 16 of FIGS. 1A-B.

Part of this forwarding can comprise forwarding a message from the content server to the client over the second secure connection, where the message comprises metadata for the content, such as a checksum and/or content size. This allows the client to verify the integrity of content which is later received, whereby the proxy is unable to tamper with the content.

In a receive security parameters step 44, security parameters are received from the content server over the first secure connection. The security parameters are associated with the second secure connection, i.e. the connection between the content server and the client. The security parameters allow the proxy to perform transmission encryption in accordance with the second secure connection, transparent for the client.

The security parameters can e.g. comprise a URI for the content. The security parameters can also comprise at least some parameters of a TLS (transport layer security) state for the second secure connection, to thereby provide sufficient data for the proxy to perform transmission encryption in accordance with the second secure connection.

In an obtain content step 47 the content is obtained. This can be based on the URI provided from the content server. The URI can point to the content server, in which case the proxy can receive the content from the content server over the first secure connection. Alternatively, the URI can point to another server in a content delivery network. Regardless to what server the URI points, the proxy could also obtain the content by retrieving the content from a cache storage. In this way, when the cache storage is local to the proxy, the need for external bandwidth usage for retrieving the content is greatly reduced.

In a transmit content step 49, the content is transmitted to the client using an encryption key derived from the security parameters. The encryption key can be explicitly provided as part of the security parameters. Alternatively or additionally, the proxy can determine the encryption key to use based on the security parameters. For instance, the security parameters can comprise parameters describing when and how the encryption key changes over time.

By providing the security parameters to the proxy, the content server delegates the encrypted connection to the client, thereby relieving this task from the content server itself. It is to be noted that the content server never needs to provide any private certificates to the proxy; it is sufficient that the content server provides security parameters related to the particular instance of the second secure connection, i.e. the current secure connection between the content server and the client. Moreover, content server is in full control of when to perform this delegation, this method can be used on a per request basis under full control of the content server.

Looking now to FIG. 3B, only new or modified steps compared to the method illustrated by the flow chart of FIG. 3A will be described.

In a store content step 48, storing the content in a cache storage. This allows the content to be fetched from the cache storage when the same content is requested by a client in the future. The cache storage can be local to the proxy.

Figure 4A:
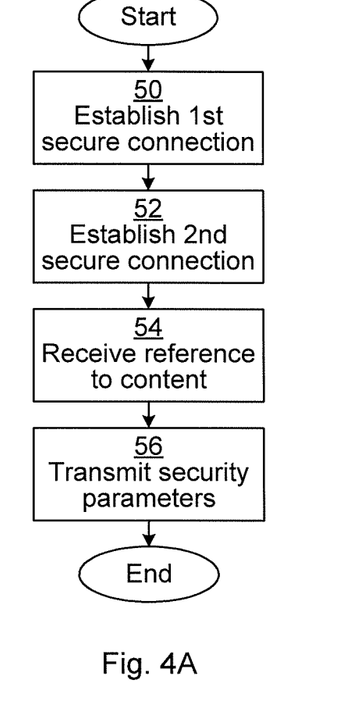
FIGS. 4A-B are flow charts illustrating methods performed in a content server for enabling a proxy to perform transmission encryption.
Figure 4B:
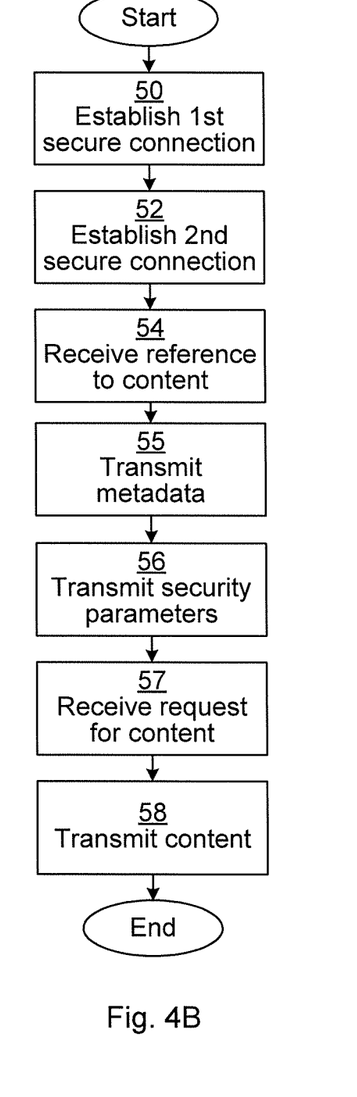

FIGS. 4A-B are flow charts illustrating methods performed in a content server for enabling a proxy to perform transmission encryption.

In an establish first secure connection step 50, the first secure connection is established between the content server and a proxy.

In an establish second secure connection step 52, the second secure connection is established between the content server and a client.

Optionally, the TCP connection which is used for the first secure connection is also used for the second secure connection.

In a receive reference to content step 54, a reference to content is received over the second secure connection from the client. The reference can be a URI, e.g. as part of an HTTP GET request.

In a transmit security parameters step 56, security parameters are transmitted to the proxy over the first secure connection. As explained above, the security parameters enable the proxy to perform transmission encryption to the client in compliance with the second secure connection. For instance, the security parameters can comprise a URI for the content and at least some parameters of a TLS state for the second secure connection. Such a URI to content may, but does not need to, be the same URI that was received in the receiver reference to content step 54.

Looking now to FIG. 4B, only new or modified steps compared to the method illustrated by the flow chart of FIG. 5A will be described.

In a transmit metadata step 55, metadata for the content is transmitted to the client over the second secure connection. For instance, the metadata can comprise a checksum for the content and/or a content size for the content, allowing the client to verify integrity of the content when received later.

In a receive request for content step 57, a request is received from the proxy for the content over the first secure connection. This allows the content server to either serve the content to the proxy directly, or to redirect the request to another node to serve the content to the proxy.

In a transmit content step 58, the content is transmitted to the proxy over the first secure connection. In this case, it is the content server that also provides the content.

Figure 5:
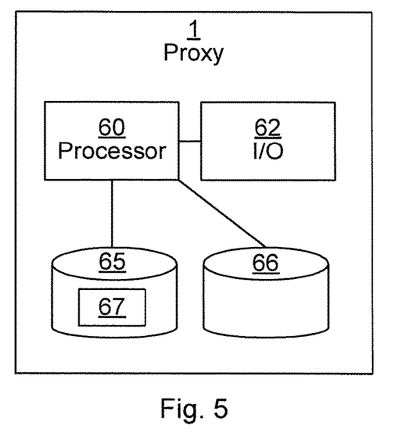
FIG. 5 is a schematic diagram showing some components of the proxy of FIGS. 1A-B and FIG. 2.

FIG. 5 is a schematic diagram showing some components of the proxy of FIGS. 1A-B and FIG. 2. A processor 60 is provided using any combination of one or more of a suitable central processing unit (CPU), multiprocessor, microcontroller, digital signal processor (DSP), application specific integrated circuit etc., capable of executing software instructions 67 stored in a memory 65, which can thus be a computer program product. The processor 60 can be configured to execute the method described with reference to FIGS. 3A-B above.

The memory 65 can be any combination of read and write memory (RAM) and read only memory (ROM). The memory 65 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM). The data memory 66 can be provide internally and/or externally to the proxy and can e.g. be a cache storage to hold cached content.

The proxy 1 further comprises an I/O interface 62 for communicating with other external entities such as clients and content servers. Optionally, the I/O interface 62 also includes a user interface.

Other components of the proxy 1 are omitted in order not to obscure the concepts presented herein.

Figure 6:
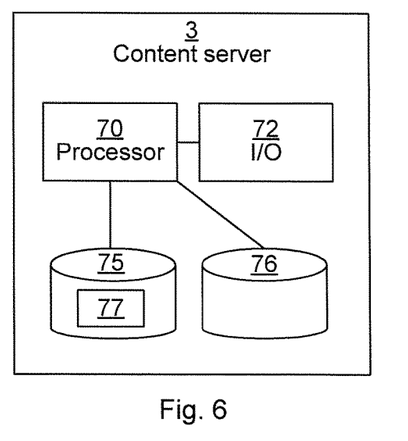
FIG. 6 is a schematic diagram showing some components of the content server of FIGS. 1A-B and FIG. 2.

FIG. 6 is a schematic diagram showing some components of the content server 3 of FIGS. 1A-B and FIG. 2. A processor 70 is provided using any combination of one or more of a suitable central processing unit (CPU), multiprocessor, microcontroller, digital signal processor (DSP), application specific integrated circuit etc., capable of executing software instructions 77 stored in a memory 75, which can thus be a computer program product. The processor 70 can be configured to execute the method described with reference to FIGS. 4A-B above.

The memory 75 can be any combination of read and write memory (RAM) and read only memory (ROM). The memory 75 also comprises persistent storage, which, for example, can be any single one or combination of magnetic memory, optical memory, solid state memory or even remotely mounted memory.

A data memory 76 is also provided for reading and/or storing data during execution of software instructions in the processor 70. The data memory 76 can be any combination of read and write memory (RAM) and read only memory (ROM). The data memory 76 can be provide internally and/or externally to the proxy and can e.g. hold cached content.

The content server 3 further comprises an I/O interface 72 for communicating with other external entities such as the proxy and clients. Optionally, the I/O interface 72 also includes a user interface.

Other components of the content server are omitted in order not to obscure the concepts presented herein.

Figure 7:
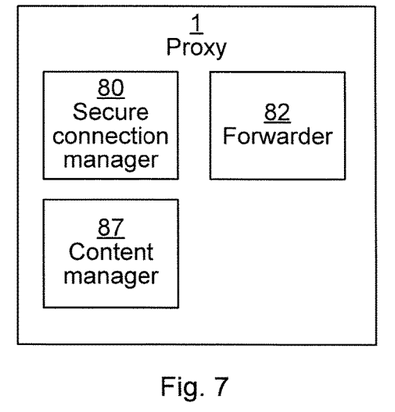
FIG. 7 is a schematic diagram showing functional modules of the proxy of FIGS. 1A-B and FIG. 2 according to one embodiment.

FIG. 7 is a schematic diagram showing functional modules of the proxy 1 of FIGS. 1A-B and FIG. 2 according to one embodiment. The modules are implemented using software instructions such as a computer program executing in the proxy 1. Alternatively or additionally, the modules could be implemented using hardware, e.g. using ASIC (Application Specific Integrated Circuits), FPGA (Field Programmable Gate Array) or even discrete components. The modules correspond to the steps in the methods illustrated in FIGS. 3A-B.

A secure connection manager 80 is configured to establish a first secure connection between the proxy and a content server and to receive security parameters from the content server over the first secure connection, the security parameters being associated with the second secure connection. This module corresponds to the establish first secure connection step 40 and the receive security parameter step 44 of FIGS. 3A-B.

A forwarder 82 is configured to forward messages between a client and the content server to establish a second secure connection between the client and the content server. This module corresponds to the forward messages for second secure connection step 42 of FIGS. 3A-B.

A content manager 87 is configured to obtain the content, to transmit the content to the client using an encryption key derived from the security parameters and to store the content in a cache storage. This module corresponds to the obtain content step 47 and the transmit content step 49 of FIGS. 3A-B and to the store content step 48 of FIG. 3B.

Figure 8:
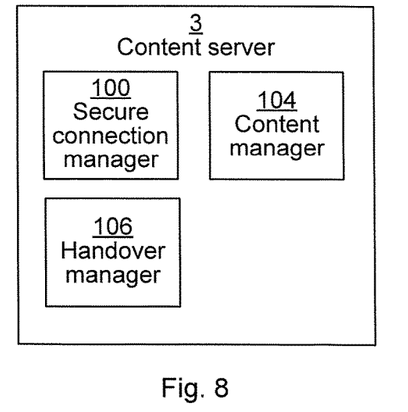
FIG. 8 is a schematic diagram showing functional modules of the content server of FIGS. 1A-B and FIG. 2 according to one embodiment.

FIG. 8 is a schematic diagram showing functional modules of the content server 3 of FIGS. 1A-B and FIG. 2 according to one embodiment. The modules are implemented using software instructions such as a computer program executing in the content server 3. The modules correspond to the steps in the methods illustrated in FIGS. 4A-B.

A secure connection manager 100 is configured to establish a first secure connection between the content server and a proxy and to establish a second secure connection between the content server and a client. This module corresponds to the establish first secure connection step 50 and the establish second secure connection step 52 of FIGS. 4A-B.

A content manager 104 is configured to receive a reference to content over the second secure connection from the client, to receive a request from the proxy for the content over the first secure connection, to transmit the content to the proxy over the first secure connection and to transmit a checksum and a content size for the content to the client over the second secure connection. This module corresponds to the receive reference to content step 54 of FIGS. 4A-B and to the transmit metadata step 55, receive request for content step 57 and transmit content step 58 of FIG. 4B.

A handover manager 106 is configured to transmit security parameters to the proxy over the first secure connection, the security parameters enabling the proxy to perform transmission encryption to transmit content to the client in compliance with the second secure connection. This module corresponds to the transmit security parameters step 56 of FIGS. 4A-B.

Figure 9:
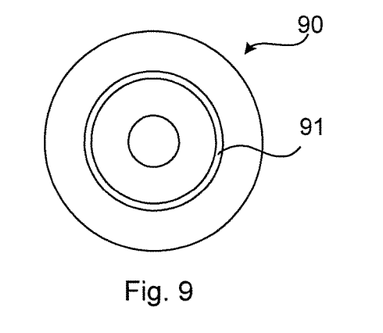
FIG. 9 shows one example of a computer program product comprising computer readable means.

FIG. 9 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 65 of FIG. 5 or 75 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a proxy device in connection with client device and a content server in a communication network, the method comprising the steps of:
   the proxy device establishing a first secure connection between the proxy device and a content server;
   the proxy device forwarding messages between a client device and the content server to establish a second secure connection between the client device and the content server, wherein the second secure connection is a TLS connection, the proxy device to forward a message from the content server to the client device over the second secure connection, the message comprising a checksum for the client device to verify the integrity of content and a content size for the content;
   the proxy device receiving security parameters from the content server over the first secure connection, the security parameters being associated with the second secure connection;
   the proxy device deriving an encryption key from the received security parameters associated with the second secure connection;
   the proxy device obtaining content from a cache storage;
   the proxy device transmitting, to the content server, a message comprising an instruction for the content server to disconnect the second secure connection between the client device and the content server; and
   after transmitting the message to the content server, the proxy transmitting the content to the client device using the derived encryption key.

2. The method according to claim 1, wherein the step of forwarding messages comprises using a transport channel being a transport control protocol connection for communication with the content server, which is also used for the first secure connection.

3. The method according to claim 1, wherein in the step of receiving security parameters, the security parameters comprise a uniform resource indicator for the content.

4. The method according to claim 1, wherein in the step of receiving security parameters, the security parameters comprise at least some parameters of a transport layer security state for the second secure connection.

5. The method according to claim 1, wherein the step of obtaining the content comprises receiving the content from the content server over the first secure connection.

6. The method according to claim 5, further comprising the step of:
   storing the content in a cache storage.

7. The method according to claim 1, wherein the step of obtaining the content comprises retrieving the content from a cache storage.

8. The method according to claim 1, further comprising the step of forwarding a message from the content server to the client device over the second secure connection, the message comprising a checksum and a content size for the content.

9. A proxy device comprising:
   a processor; and
   a memory storing instructions that, when executed by the processor, causes the proxy device to:
   establish a first secure connection between the proxy device and a content server;
   forward messages between a client device and the content server to establish a second secure connection between the client device and the content server, wherein the second secure connection is a TLS connection, the proxy device to forward a message from the content server to the client device over the second secure connection, the message comprising a checksum for the client device to verify the integrity of content and a content size for the content;
   receive security parameters from the content server over the first secure connection, the security parameters being associated with the second secure connection;
   derive an encryption key from the received security parameters associated with the second secure connection;
   obtain content from a cache store;
   transmit, to the content server, a message comprising an instruction for the content server to disconnect the second secure connection between the client device and the content server; and
   after transmitting the message to the content server, transmit the content to the client device using the derived encryption key.

10. The proxy device according to claim 9, wherein the instructions to forward messages comprise instructions that, when executed by the processor, causes the proxy to use a transport channel being a transport control protocol connection for communication with the content server, which is also used for the first secure connection.

11. The proxy device according to claim 9, wherein the security parameters comprise a uniform resource indicator for the content.

12. The proxy device according to claim 9, wherein the security parameters comprise at least some parameters of a transport layer security state for the second secure connection.

13. The proxy device according to claim 9, wherein the instructions to obtain the content comprise instructions that, when executed by the processor, causes the proxy device to receive the content from the content server over the first secure connection.

14. The proxy device according to claim 13, further comprising instructions that, when executed by the processor, causes the proxy device to store the content in a cache storage.

15. The proxy device according to claim 9, wherein the instructions to obtain the content comprise instructions that, when executed by the processor, causes the proxy device to retrieve the content from a cache storage.

16. A computer program product comprising a non-transitory computer readable medium storing computer program code which, when run on a proxy device causes the proxy device to:
   establish a first secure connection between the proxy device and a content server;
   forward messages between a client device and the content server to establish a second secure connection between the client device and the content server, wherein the second secure connection is a TLS connection, the proxy device to forward a message from the content server to the client device over the second secure connection, the message comprising a checksum for the client device to verify the integrity of content and a content size for the content;
   receive security parameters from the content server over the first secure connection, the security parameters being associated with the second secure connection;
   derive an encryption key from the received security parameters associated with the second secure connection;
   obtain content from a cache storage;
   transmitting, to the content server, a message comprising an instruction for the content server to disconnect the second secure connection between the client device and the content server; and
   after transmitting the message to the content server, transmit the content to the client device using the derived encryption key.

17. A method performed in a content server, the method comprising the steps of:
   the content server establishing a first secure connection between the content server and a proxy device;
   the content server establishing a second secure connection between the content server and a client device, wherein the second secure connection is a TLS connection, the content server to forward a message to the proxy device for the client device over the second secure connection, the message comprising a checksum for the client device to verify the integrity of content and a content size for the content;
   the content server receiving a reference to content over the second secure connection from the client device;
   the content server transmitting security parameters associated with the second secure connection to the proxy device over the first secure connection, the security parameters enabling the proxy device to: (i) derive an encryption key from the security parameters and (ii) transmit content to the client device using the derived encryption key in compliance with the second secure connection;
   the content server receiving a message transmitted by the proxy device, the message comprising an instruction for the content server to disconnect the second secure connection between the content server and the client device; and
   as a result of receiving the message transmitted by the proxy device, the content server disconnecting the second secure connection.

18. The method according to claim 17, wherein the step of establishing a second secure connection comprises using a transport channel being a transport control protocol connection which is also used for the first secure connection.

19. The method according to claim 17, further comprising the steps of:
   receiving a request from the proxy device for the content over the first secure connection; and
   transmitting the content to the proxy device over the first secure connection.

20. The method according to claim 17, wherein in the step of transmitting security parameters, the security parameters comprise a uniform resource indicator for the content.

21. The method according to claim 17, wherein in the step of transmitting security parameters, the security parameters comprise at least some parameters of a transport layer security state for the second secure connection.

22. A content server comprising:
   a processor; and
   a memory storing instructions that, when executed by the processor, causes the content server to:
   establish a first secure connection between the content server and a proxy device;
   establish a second secure connection between the content server and a client device, wherein the second secure connection is a TLS connection, the content server to forward a message to the proxy device for the client device over the second secure connection, the message comprising a checksum for the client device to verify the integrity of content and a content size for the content;
   receive a reference to content over the second secure connection from the client device;
   transmit security parameters associated with the second secure connection to the proxy device over the first secure connection, the security parameters enabling the proxy device to: (i) derive an encryption key from the security parameters and (ii) transmit content to the client device using the derived encryption key in compliance with the second secure connection;
   receive a message transmitted by the proxy device, the message comprising an instruction for the content server to disconnect the second secure connection between the content server and the client device; and
   as a result of receiving the message transmitted by the proxy device, disconnect the second secure connection.

23. The content server according to claim 22, wherein the instructions to establish a second secure connection comprise instructions that, when executed by the processor, causes the content server to use a transport channel being a transport control protocol connection which is also used for the first secure connection.

24. The content server according to claim 17, further comprising instructions that, when executed by the processor, causes the content server to:
   receive a request from the proxy device for the content over the first secure connection; and
   transmit the content to the proxy device over the first secure connection.

25. The content server according to claim 17, wherein the security parameters comprise a uniform resource indicator for the content.

26. The content server according to claim 17, wherein the security parameters comprise at least some parameters of a transport layer security state for the second secure connection.

27. A computer program product comprising a non-transitory computer readable medium storing computer program code which, when run on a content server causes the content server to:
   establish a first secure connection between the content server and a proxy device;

establish a second secure connection between the content server and a client device, wherein the second secure connection is a TLS connection, the content server to forward a message to the proxy device for the client device over the second secure connection, the message comprising a checksum for the client device to verify the integrity of content and a content size for the content;

receive a reference to content over the second secure connection from the client device;

transmit security parameters associated with the second secure connection to the proxy device over the first secure connection, the security parameters enabling the proxy to: (i) derive an encryption key from the security parameters and (ii) transmit content to the client device using the derived encryption key in compliance with the second secure connection;

receive a message transmitted by the proxy device, the message comprising an instruction for the content server to disconnect the second secure connection between the content server and the client device; and as a result of receiving the message transmitted by the proxy device, disconnect the second secure connection.

28. The method according to claim 17, the method further comprising the steps of:

after receiving the reference, the content server transmitting a response to the client device, the response comprising a close connection indication indicating that the client device close a connection between the client device and the proxy device after the client device obtains the content from the proxy device.

* * * * *